(12) United States Patent
Garnero et al.

(10) Patent No.: US 7,822,045 B2
(45) Date of Patent: Oct. 26, 2010

(54) ROUTING KEY INTERPRETER

(75) Inventors: Pierre Garnero, Grasse (FR); Jean-Christophe Cimino, Villeneuve-Loubet (FR); Stephane Barbier, Mouans-Sartoux (FR); Didier Desiderio, Le Cannet (FR); Francois Brepson, Le Cannet (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1105 days.

(21) Appl. No.: 10/931,466

(22) Filed: Aug. 31, 2004

(65) Prior Publication Data

US 2006/0045103 A1 Mar. 2, 2006

(51) Int. Cl.
*H04L 12/26* (2006.01)
(52) U.S. Cl. .................. 370/401; 370/410; 370/466; 717/136
(58) Field of Classification Search ............. 370/401; 717/136, 142
See application file for complete search history.

(56) References Cited

U.S. PATENT DOCUMENTS

| 5,410,701 A * | 4/1995 | Gopalraman ............... 717/142 |
| 2001/0055380 A1* | 12/2001 | Benedyk et al. ............ 379/219 |
| 2003/0123447 A1 | 7/2003 | Smith ........................ 370/394 |

FOREIGN PATENT DOCUMENTS

| DE | EP0434856 A1 * | 12/1989 |
| WO | 02/48856 A1 | 6/2002 |

OTHER PUBLICATIONS

Sidebottom, G., et al., "RFC 3332: Signaling System 7 (SS7) Message Transfer Part 3 (MTP3)-User Adaption Layer (M3UA)," Internet: <http://www.ietf.org> pp. 1-127 (Sep. 2002).

* cited by examiner

*Primary Examiner*—Jayanti K Patel
*Assistant Examiner*—Bo Hui A Zhu

(57) ABSTRACT

A method of providing a routing key interpreter for a signalling gateway, the method comprising the steps of generating an input file comprising a plurality of input expressions and a plurality of routing keys corresponding to the input expression, supplying the input file to a lexical analyser generator to generate a lexical analyser, and implementing the routing key interpreter using the lexical analyser.

15 Claims, 3 Drawing Sheets

ROUTING KEY INTERPRETER

DESCRIPTION OF INVENTION

This invention relates to a method of providing a routing key interpreter and a signalling gateway comprising a routing key interpreter.

BACKGROUND OF INVENTION

A common problem when connecting networks is that of ensuring messages from one network are correctly routed to a destination on the other network. A particular example of this is in the connection of networks using Internet Protocol (IP) to the existing telephone switched circuit network (PSTN). The infrastructure uses very different technologies and protocol: for example a PSTN uses the SS7 protocol, and it is desirable to provide PSTN signalling over an IP network reliably.

An approach to providing a reliable connection between IP and SS7 networks has been proposed by the Internet Engineering Task Force (IETF). This includes M3UA, which is a protocol for the transport of any MTP3—user signalling over IP and SUA which defines the protocol for the transport of any SCCP user signalling over IP. Two main entities are defined: the signalling gateway ("SG"), which is the connection point between the SS7 and IP networks, and the application server (AS) which is the software application provided on the IP network which it is desired to make available over the SS7 network. The protocols may be used to connect SS7-based signalling end points (SEP) with an IP based AS thus allowing SS7 networks to access IP based applications.

A function performed by the signalling gateway is to receive SS7 signalling messages and direct them to the appropriate AS. To do so, the SG identifies a routing key (RK) defined by the M3UA or SUA protocol, which uniquely identifies the AS in accordance with parameters in the SS7 message. In general, the RK parameters are found in the header of the SS7 message. However, it may be desirable to take into account other elements of the message, such as a SMS originating number or even some aspect of the message content, in order to direct the message to the appropriate AS.

Conventionally, the parameters of the SS7 message are compared with those of registered or configured RK's until an RK is found that matches them. The RK provisioning generally comprises a database which contains all of valid routing keys and the matching message parameters. To match a received message with a routing key, the interpreter has to go through the RK database and find one which matches the parameters of the incoming SS7 message. This is potentially very complex if higher protocol layers or an unusual set of parameters have to be taken into account, and as such the interpreter must be able to deal with any allowed set of routing keys because the routing key provision is not known in advance. The interpreter cannot therefore be optimized for any given set of provisioned RK's, leading to an unacceptable issues such as delays when identifying the relevant routing key. This is particularly the case where the message comprises "wild card" or parameters which can take any value and so the interpreter must search through a number of combinations of possible routing keys.

An aim of the invention is to reduce or overcome the above problem.

SUMMARY OF THE INVENTION

According to one aspect of the invention we provide a method of providing a routing key interpreter for a signalling gateway, the method comprising the steps of generating an input file comprising a plurality of input expressions and a plurality of routing keys corresponding to the input expression, supplying the input file to a lexical analyser generator to generate a lexical analyser, and providing the routing key interpreter using the lexical analyser.

The input expressions may comprise parameters of signalling messages in accordance with a first signalling protocol.

The routing keys may correspond to destination addresses in accordance with a second protocol.

The step of generating the input file may comprises a step of modifying an existing input file.

The lexical analyser generator may generate an output comprising an source code file and the method may comprise the step of compiling the source code file to provide the lexical analyser.

The method may comprise passing the lexical analyser to the signalling gateway.

The method may comprise providing a parser operable to call the lexical analyser.

According to a second aspect of the invention we provide a routing key interpreter where generated by a method according to the first aspect of the invention.

According to a third aspect of the invention we provide a signalling gateway comprising a routing key interpreter, wherein the routing key comprises a lexical analyser, the signalling gateway being operable to receive a message from a first network, pass the message to the routing key interpreter, receive a routing key from the routing key interpreter identifying a destination address on a second network in accordance with the message, and forward the message to the destination address.

The message may be transmitted on the first network in accordance with a first protocol and on the second network in accordance with a second protocol.

BRIEF DESCRIPTION OF DRAWINGS

An embodiment of the invention will now be described by way of example only with reference to the accompanying drawings wherein.

DESCRIPTION OF THE PREFERRED EMBODIMENT

Figure 1:
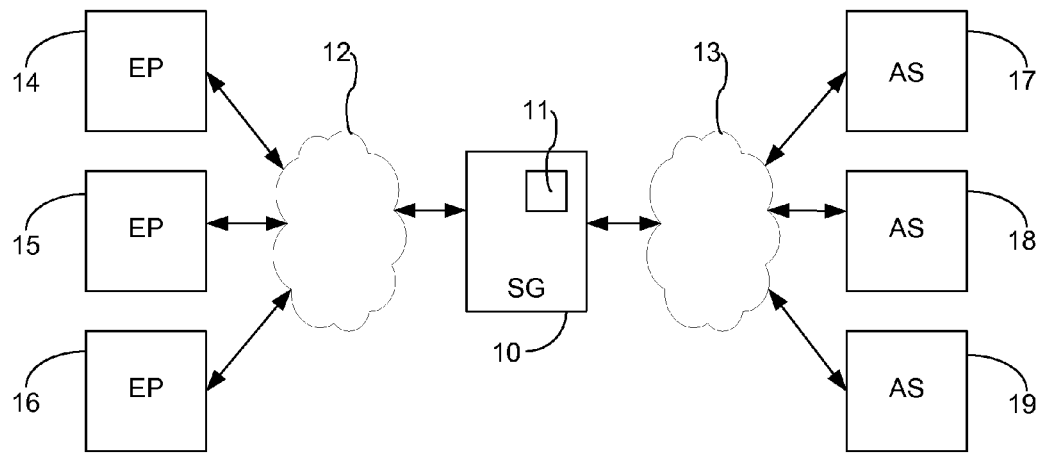
FIG. 1 is a diagrammatic illustration of a network including a signalling gateway embodying the present invention.

Referring to FIG. 1, a signalling gateway embodying the present invention is shown at 10, provided with a routing key interpreter 11. The signalling gateway 10 is operable to communicate over a first network 12 and send and receive messages to and from end points on the network 12 using a first protocol, in this example using the SS7 protocol. The signalling gateway 10 is also able to communicate over the second network 13, in this example using the IP protocol. The signalling gateway 10 is operable to send and receive messages via the first network 12 from a plurality of end points 14, 15, 16, and to transmit and receive messages over the second network 13 from a plurality of application servers 17, 18, 19.

Figure 2:
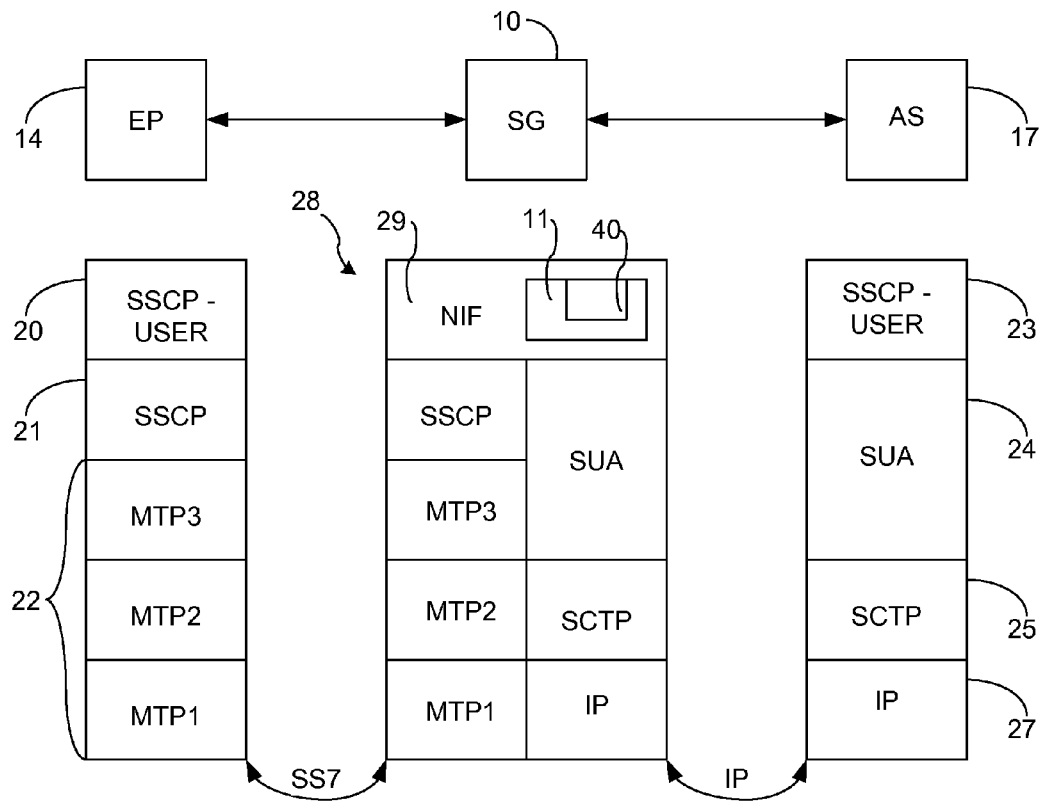
FIG. 2 is a diagrammatic illustration of the architecture of the network of FIG. 1.

As best seen in FIG. 2, the protocols used for transmitting messages over the first network 12 comprises a signalling connection control part (SCCP) user part 20 over the SCCP 21 and then the appropriate message transfer (MTP) levels shown at 22. The application servers transmit messages using an SCCP user part shown at 23 over a SCCP user adaptation layer (SUA) 24, and uses the stream control transmission protocol (SCTP) over the Internet Protocol (IP) layer 27. The signalling gateway architecture generally shown at 28 has a nodal interworking function (NIF) illustrated at 29 to convert SS7 signals to SUA signals and vice versa using the routing key interpreter generally indicated at 11. The signalling gateway 10 may sit between any appropriate pair of protocols as desired, for example the signalling gateway 10 may be operable convert SS7 signals to M3UA messages or otherwise as desired.

Each application server 17, 18, 19 has a unique routing key associated with it. The routing keys maybe configured statically at the application server and at the signalling gateway, or maybe configured statically at the application server which then dynamically registers itself at the signalling gateway by means of routing key management messages. To match a routing key to an incoming message, the routing key interpreter 11 is operable to read a message as generally illustrated at 30 and identifying the values of certain parameters within the message generally illustrated at 31, 32 and 33. The routing key interpreter then identifies the routing key that matches the values of parameters 31, 32, 33 and returns the appropriate routing key.

Figure 3:
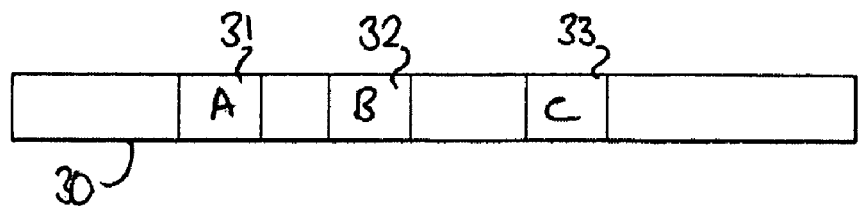
FIG. 3 is a diagrammatic illustration of a signalling message.
Figure 4:
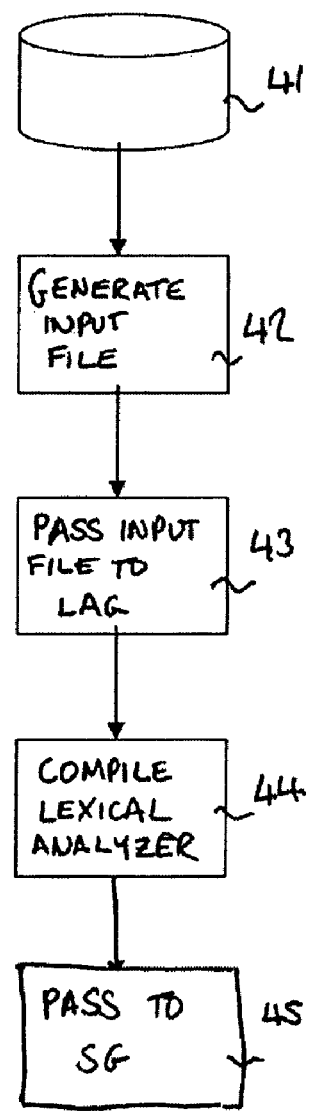
FIG. 4 is a flow diagram showing a method of providing a lexical analyser.

To perform the step of identifying the correct routing key, the routing key interpreter 11 comprises a lexical analyser 40. A lexical analyser is a piece of code that takes a text file as an input, searches for regular expressions within the input file and generates an appropriate output in accordance with the identified regular expressions. In the present example, the lexical analyser 40 searches for regular expressions within a received message which correspond to the values of the relevant parameters 31, 32, 33. To generate a lexical analyser, a method is performed as shown in FIG. 4. A database 41 is provided comprising a plurality of input expressions and a plurality of routing keys corresponding to the input expressions, and may be derived from, for example, the RKs registered at the signalling gateway 10. The input expressions are regular expressions which correspond to the values for the parameters 31, 32, 33 in the example of FIG. 3. At step 42, an input file is generated from the routing key and parameter information in the database 41, and at step 43 the input file is passed to a lexical analyser generator such as LEX or FLEX or any other lexical analyser generator as required. In general, lexical analyser generators generate a source code file as their output, so at step 44 the source code file is compiled to provide an executable file, and at step 45 the lexical analyser is passed to the signalling gateway 10. The lexical analyser may be passed to the signalling gateway 10 by, for example, providing the lexical analyser as a sharable library which is dynamically loaded by the signalling gateway 10. If desired, the routing key interpreter may be provided with an appropriate parser, such as YACC or BISON, to call the lexical interpreter and handle the returned routing key or otherwise as appropriate.

Figure 5:
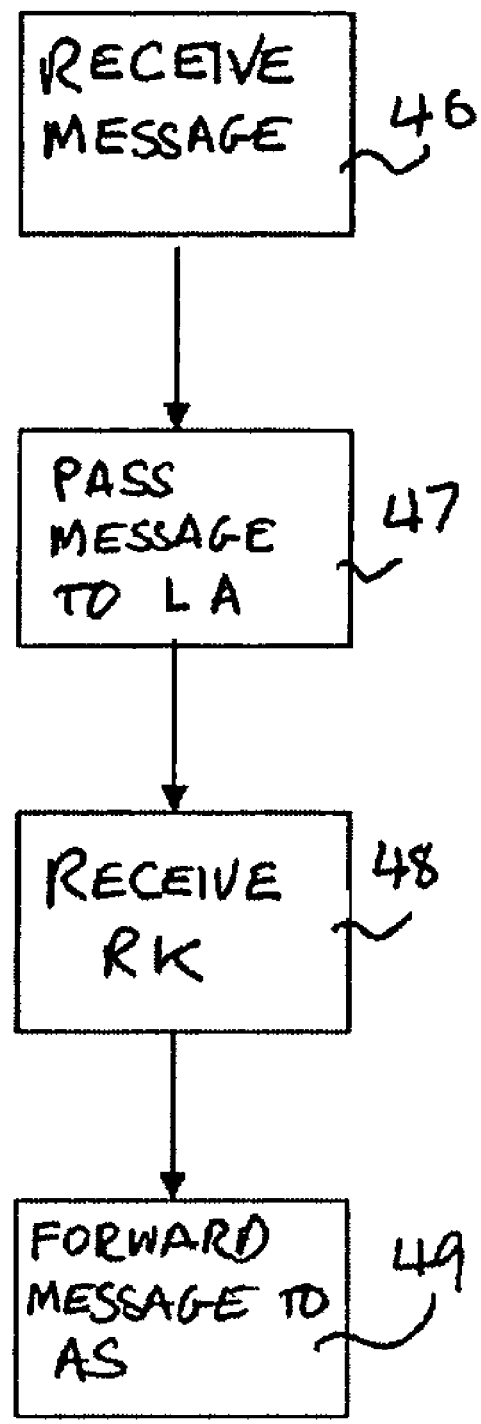
FIG. 5 shows a method of operation of a signalling gateway embodying the present invention.

As shown in FIG. 5, at step 46 the signalling gateway 10 can receive a message and at step 47 passes the message to the routing key interpreter 11 which passes it to the lexical analyser 40 to identify the matching routing key. The routing key interpreter will then return the routing key as shown in step 48, and the signalling gateway 10 will forward the message to the appropriate application server 17, 18, 19 identified by the routing key as shown at step 49.

This method is thus particularly advantageous in that the lexical analyser 40 is always optimised for the particular set of routing keys and the associated input expressions which can be handled by the signalling gateway 10. As such, the identification of a routing key corresponding to a received message can be particularly fast: in the present example approximately 1 million instructions per minute. The input file can comprise a simple text file listing the relevant input expressions corresponding to values of the parameters 31, 32, 33 and the corresponding routing key, for example in the simple format (field=value; field=value; . . . ; result). It thus follows that if the routing key provisioning needs to be updated, the pre-existing input file can be simply modified by adding or deleting appropriate lines of text, and a new lexical analyser generated by passing the input file to the lexical analyser generator, and then passing the lexical analyser to the signalling gateway.

The routing key interpreter provided by this method is yet more flexible in that it allows an operator to identify a routing key based not only on the standard parameters provided in a message, but also any other information provided in a message, such as the message content, or the subset of a range of telephone digits included in the SMS originator, or define non matching digits so that a message will not match a routing key if it contains those digits. A message may then be routed to an appropriate application server depending on any appropriate parameter which an operator desires.

The present invention may be used to provide a signalling gateway between any appropriate pair of networks using different protocols as desired.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of providing a routing key interpreter for a signalling gateway, the method comprising:
    generating an input file comprising a plurality of input expressions and a plurality of routing keys corresponding to the input expressions, wherein the input expressions comprise parameters of signaling messages in accordance with a first signaling protocol;
    supplying the input file to a lexical analyser generator to generate a lexical analyser for use in analysing messages for routing keys, said routing keys useable to forward messages by a signaling gateway from one network to another network; and
    providing the routing key interpreter using the lexical analyzer, wherein the lexical analyser comprises executable codes.

2. A method according to claim 1 wherein the routing keys correspond to destination addresses in accordance with a second protocol.

3. A method according to claim 1 wherein generating the input file comprises modifying an existing input file.

4. A method according to claim 1 wherein the lexical analyser generator generates an output comprising a source code file and the method comprises compiling the source code file to provide the lexical analyser.

5. A method according to claim 1 comprising passing the lexical analyser to the signaling gateway.

6. A method according to claim 1 comprising providing a parser operable to call the lexical analyser.

7. A routing key interpreter generated by a method according to claim 1.

8. A signalling gateway comprising a routing key interpreter, the signalling gateway being operable to:
receive a message from a first network; pass the message to the routing key interpreter comprising a lexical analyzer generated using an input file comprising a plurality of input expressions and a plurality of routing keys corresponding to the input expressions, wherein the input expressions comprise parameters of signaling messages in accordance with a first signaling protocol;
receive a routing key from the routing key interpreter identifying a destination address on a second network in accordance with the message;
forward the message to the destination address; and
wherein the lexical analyzer comprises executable codes.

9. A signalling gateway according to claim 8 wherein the message is transmitted on the first network in accordance with a first protocol and on the second network in accordance with a second protocol.

10. A method of providing a routing key interpreter for a signalling gateway, the method comprising:
generating an input file comprising a plurality of input expressions and a plurality of routing keys corresponding to the input expression, wherein the input expressions comprise parameters of signalling messages in accordance with a first signalling protocol and the routing keys correspond to destination addresses in accordance with a second protocol;
supplying the input file to a lexical analyser generator to generate a lexical analyser by generating an output comprising a source code file and the method comprises compiling the source code file to provide the lexical analyser, the generated lexical analyzer for use in analysing messages for routing keys, said routing keys useable to forward messages by the signaling gateway from one network to another network; and
providing the routing key interpreter using the lexical analyser; wherein the lexical analyser comprises executable codes.

11. A method according to claim 10 wherein generating the input file comprises modifying an existing input file.

12. A method according to claim 10 comprising passing the lexical analyser to the signalling gateway.

13. A method according to claim 10 comprising providing a parser operable to call the lexical analyser.

14. A method for operating a signalling gateway, the method comprising:
generating an input file comprising a plurality of input expressions and a plurality of routing keys corresponding to the input expression, wherein the input expressions comprise parameters of signalling messages in accordance with a first signalling protocol and the routing keys correspond to destination addresses in accordance with a second protocol;
supplying the input file to a lexical analyser generator to generate a lexical analyser by generating an output comprising a source code file and the method comprises compiling the source code file to provide the lexical analyser, the generated lexical analyzer for use in analysing messages for routing keys, said routing keys useable to forward messages by the signaling gateway from one network to another network;
passing the lexical analyser to the signalling gateway; and
providing a routing key interpreter using the lexical analyser; wherein the lexical analyser comprises executable codes.

15. A method according to claim 14 wherein generating the input file comprises modifying an existing input file.

* * * * *